United States Patent
Lau et al.

(10) Patent No.: US 10,064,043 B2
(45) Date of Patent: Aug. 28, 2018

(54) CONNECTING USER EQUIPMENT TO DIFFERENT CORE NETWORKS

(71) Applicant: Verizon Patent and Licensing Inc., Arlington, VA (US)

(72) Inventors: Priscilla Lau, Fremont, CA (US); Emerando M. Delos Reyes, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

(21) Appl. No.: 15/195,839

(22) Filed: Jun. 28, 2016

(65) Prior Publication Data
US 2017/0374695 A1    Dec. 28, 2017

(51) Int. Cl.
*H04W 8/02* (2009.01)
*H04W 76/11* (2018.01)
*H04L 29/06* (2006.01)
*H04W 88/16* (2009.01)

(52) U.S. Cl.
CPC ............... *H04W 8/02* (2013.01); *H04L 65/60* (2013.01); *H04W 76/11* (2018.02); *H04W 88/16* (2013.01)

(58) Field of Classification Search
None
See application file for complete search history.

(56) References Cited

U.S. PATENT DOCUMENTS

| | | | | |
|---|---|---|---|---|
| 2011/0090852 A1* | 4/2011 | Ramle | ........... | H04W 48/17 370/328 |
| 2013/0070665 A1* | 3/2013 | Yang | ........... | H04W 24/02 370/315 |
| 2015/0382286 A1* | 12/2015 | Daoud | ........... | H04W 48/16 455/434 |
| 2016/0142855 A1* | 5/2016 | Yu | ........... | H04W 8/06 455/419 |

* cited by examiner

*Primary Examiner* — Christopher Crutchfield
*Assistant Examiner* — Alan Lindenbaum

(57) ABSTRACT

Techniques described herein may enable user equipment (e.g., user broadband devices, Internet of Things (IoT) devices, etc.) to connect to different core networks of a wireless telecommunication network. The core networks may support different network services (e.g., Voice over Internet Protocol (VoIP) services, Internet access service, telematics services, Video on Demand (VoD) services, etc.) and a UE may connect be connected to the appropriate core network based on an Access Point Name identifier (APN ID) that the UE may provide to the network (e.g., upon sending a request to connect to the wireless telecommunication network).

20 Claims, 9 Drawing Sheets

| Network Policy for Connecting UEs with Core Networks |||||
| --- | --- | --- | --- |
| APN ID | Service Description | MME IP Address | Routing Description |
| Internet_APN | 4G/VoLTE | 2001:db8::2:1 | Route communications from UE to and from 4G Core Network |
| Apps_APN | 4G/VoLTE | 2001:db8::2:1 | Route communications from UE to and from 4G Core Network |
| Enterprise_APN | IoT/M2M | 2001:db8::2:2 | Route communications from UE to and from IoT Core Network |
| Telematics_APN | IoT/M2M | 2001:db8::2:2 | Route communications from UE to and from IoT Core Network |
| PrivateNetwork_APN | IoT/M2M | 2001:db8::2:2 | Route communications from UE to and from IoT Core Network |
| BroadbandTV_APN | 5G | 2001:db8::2:3 | Route communications from UE to and from 5G Core Network |
| OnDemandVideo_APN | 5G | 2001:db8::2:3 | Route communications from UE to and from 5G Core Network |
| ... | ... | ... | ... |

Fig. 6

CONNECTING USER EQUIPMENT TO DIFFERENT CORE NETWORKS

BACKGROUND

Wireless telecommunication networks often include user equipment (UE) that connects to a core network via a radio access network (RAN). An example of a wireless telecommunication network may include an Evolved Packet System (EPS) with a Long Term Evolution (LTE) network and an evolved packet core (EPC) network, which operates based on the 3rd Generation Partnership Project (3GPP) wireless communication standard. The LTE network may include a RAN that includes one or more base stations, some or all of which may take the form of evolved Node Bs (eNBs), through which the UE may communicate with the EPC network.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 6 illustrates an example APN routing policy that may be implemented by APN assignment server;

DETAILED DESCRIPTION OF PREFERRED EMBODIMENTS

Figure 1:
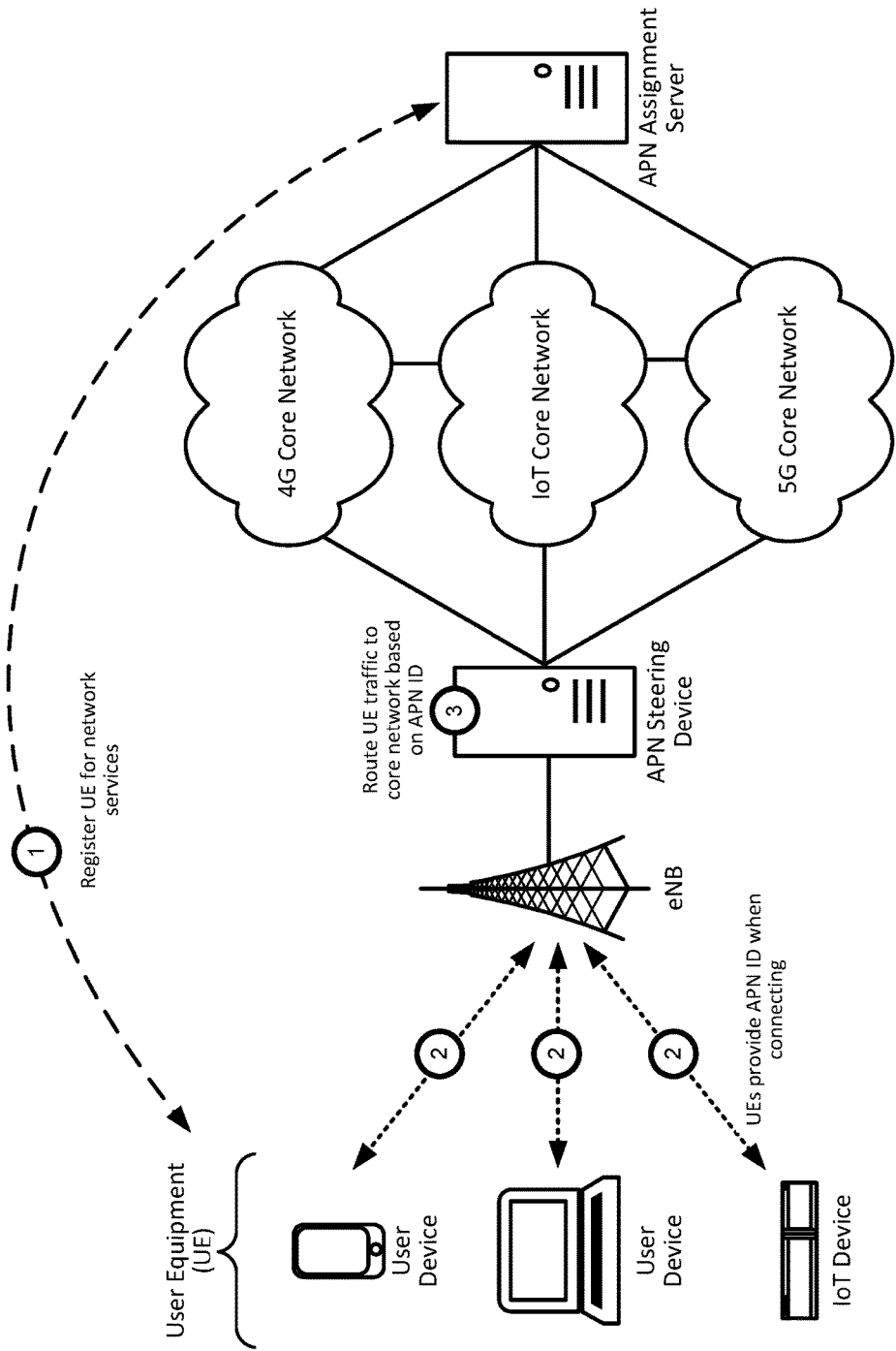
FIG. 1 illustrates an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Some wireless telecommunication networks may include multiple core networks that are each associated with a different Public Land Mobile Network Identifier (PLMN ID). In typical or conventional systems, when a user equipment (UE) connects to the network, the UE may provide a PLMN ID to the network, and the network may cause the UE to connect to the core network associated with the PLMN ID. Although there are existing standards to allow this to be achieved, introducing a new PLMN ID may have other difficulties, such as most commercial eNB can only support up to 6 PLMN IDs and roaming agreements with all roaming parties will need to be revised.

For example, UEs typically receive a roaming list that contains PLMN IDs that it can access and the priority of them from their service providers. If one service provider implements multiple core networks that each have different PLMN IDs, then the UEs of its own and all the other service providers must be aware of the different PLMN IDs in order to access the network with the multiple core networks. From a practical standpoint, this can be very difficult to implement as it may require negotiating, compromising, and other types of deal-making efforts, between service providers, in order to have other subscriber networks update their UEs with the PLMN IDs of the subscriber network with multiple core networks.

In addition, wireless telecommunication networks that use different PLMN IDs for each core network may increase create inter-network congestion. For example, a UE may connect to one core network for a particular service (e.g., a Voice of Internet Protocol (VoIP) service or IP Multimedia System (IMS)), which may result in the UE connecting to a Mobility Management Entity (MME) of that core network. While the service is ongoing (i.e., during a VoIP call), the UE may access another network service that corresponds to a different core network (e.g., an Internet access service), which may result in the UE connecting to an MME of that core network as well (i.e., two different MMES of two different core networks, in this example). In such a scenario, the MMES of each core network may have to relay information between one another in order to maintain awareness of the UE accessing both services (e.g., the VoIP service and the Internet access service), which may create inter-network congestion between the two core networks.

Techniques described herein may enable UEs to connect to a particular core network of a wireless telecommunication network, which has multiple core networks, based on Access Point Name Identifiers (APN IDs) provided by the UEs to the network. For example, a wireless telecommunication network may include a first core network that is based on a 4th Generation System defined by 3rd Generation Partnership Project (3GPP) standards (e.g., an evolved packet core (EPC)) that may provide Internet access services, mobile application services, IP Multimedia System (IMS) services, (e.g., voice calls, video calls, etc.). The wireless telecommunication network may also include a second core network (e.g., an Internet of Things (IoT) core network) that provides network services primarily to IoT devices (e.g., telematics services). The wireless telecommunication network may also include a third core network that is based on 5th Generation Partnership Project (5GPP or 5G) technology and may provide high-bandwidth service such as video streaming services, Video on Demand (VoD) services, etc., for example as part of a 5G wireless network.

APN IDs may be associated with the different types of services offered by these core networks. For instance, an APN IDs for Internet access and mobile application services may be associated with the first core network; APN IDs for telematics services may be associated with the second core network; and APN IDs for broadband television services, VoD services, etc., may be associated with the third core network. As such, when a UE sends a request to connect to the wireless telecommunication network, the UE may provide an APN ID that corresponds to the network service for which the UE is connecting to the network.

An APN steering device may receive the request, identify the core network that corresponds to the APN ID of the request, and route the traffic from the UE to the appropriate core network. In some implementation, the UE may know the APN ID (that corresponds to the service for which the UE is connecting) by having been previously registered for the service. In other implementations, such as when the UE is roaming, the UE may provide a well-known APN ID that is designated as a default for a particular service (e.g., Internet access, telematics, IMS, VoD, etc.) ad defined by standards or industrials forum so that they are recognized by all networks. As such the techniques described herein may include using APN IDs to connect UEs to different core networks within a wireless telecommunication network that provides services using a single PLMN ID.

FIG. 1 illustrates an example overview of an implementation described herein. As shown, a user may register UEs (with APN Assignment Server) for different network services (at 1). In some implementations, registering UEs for different network services may include accessing an APN assignment server and associating a particular UE (e.g., a smartphone, a laptop computer, an IoT device, etc.) with one or more services offered by the network. Examples of such services may include Internet access, IMS call sessions, telematics services, VoD services, IoT management services, etc. In response, the APN assignment server may provide the UE with APN IDs that correspond to the services for which the UE has been registered. For example, an SIM card over-the-air activation system (SIM OTA) may be used to provision the APN IDs that the UE may request services from the wireless operator.

As such, when the UE initiates a connection with the network (e.g., connects to a base station of the network (e.g., an enhanced Node B (eNB)), the UE may use a standard Radio Resource Control (RRC) Connection Request to an eNB. When the eNB responds back with an RRC Connection Setup, the UE may send an RRC Connection Setup Complete message carrying an Attach Request to the eNB, and the Attach Request may contain a Packet Data Network (PDN) Connectivity Request with an APN ID that corresponds to one of the services for which the UE has been registered with the network provider. Upon receiving the RRC Connection Setup Complete message, the eNB may forward the Attach Request message to an APN steering device which may determine which core network is appropriate to serve the UE based on the APN ID inside PDN Connectivity Request.

For example, a UE may send an Attach Request message to the network after the UE enters a new coverage area in order to establish connectivity and access the Internet. The UE may include the APN ID for gaining Internet access in a PDN Connectivity Request that is inside the Attach Request. The eNB may pass the Attach Request to the APN Steering Device (at 3 of FIG. 1) and the APN steering device may route the Attach Request to a Mobility Management Entity (MME) in an appropriate core network. In some implementations, the APN ID may be "Internet." After the UE has established a connection with the appropriate core network PDN, the UE may have access to the Internet (e.g., for browsing or downloading data from Internet). At a later time, or at the same time, the UE may access a different service (such as VoLTE) that may require an APN ID for the IMS. As such, the UE may send, in another Attach Request message, another PDN Connectivity Request with the Request Type information element set to the APN ID for the IMS to the same eNB. Alternatively, the UE may send, to the same eNB, a standalone PDN Connectivity Request with the Request Type information element set to initial request and APN information element set to the requested APN ID (e.g., the APN ID for the IMS). Again, the eNB may forward the Attach Request (or the standalone PDN Connectivity Request) to the APN steering device, and the APN steering device may route the connection request for the UE to a core network associated with the APN ID. The core networks selected by the APN steering device for the Internet APN and the IMS APN may be the same device or different devices.

For example, communications with APN IDs that correspond to Internet access and/or mobile application services may be routed to the 4G core network; communications with APN IDs that correspond to IoT services (e.g., telematics services, machine-to-machine (M2M) management services, etc.) may be routed to the IoT core network; and communications with APN IDs that correspond to broadband television services, on-demand services, or other streaming multimedia services may be routed to the 5G core network. As such, the techniques described herein may enable UEs to connect to a particular core network of a wireless telecommunication network (with multiple core networks) to ensure that, for example, each UE connects to the core network designed to provide the network services for which the UE has connected to the network.

Figure 2:
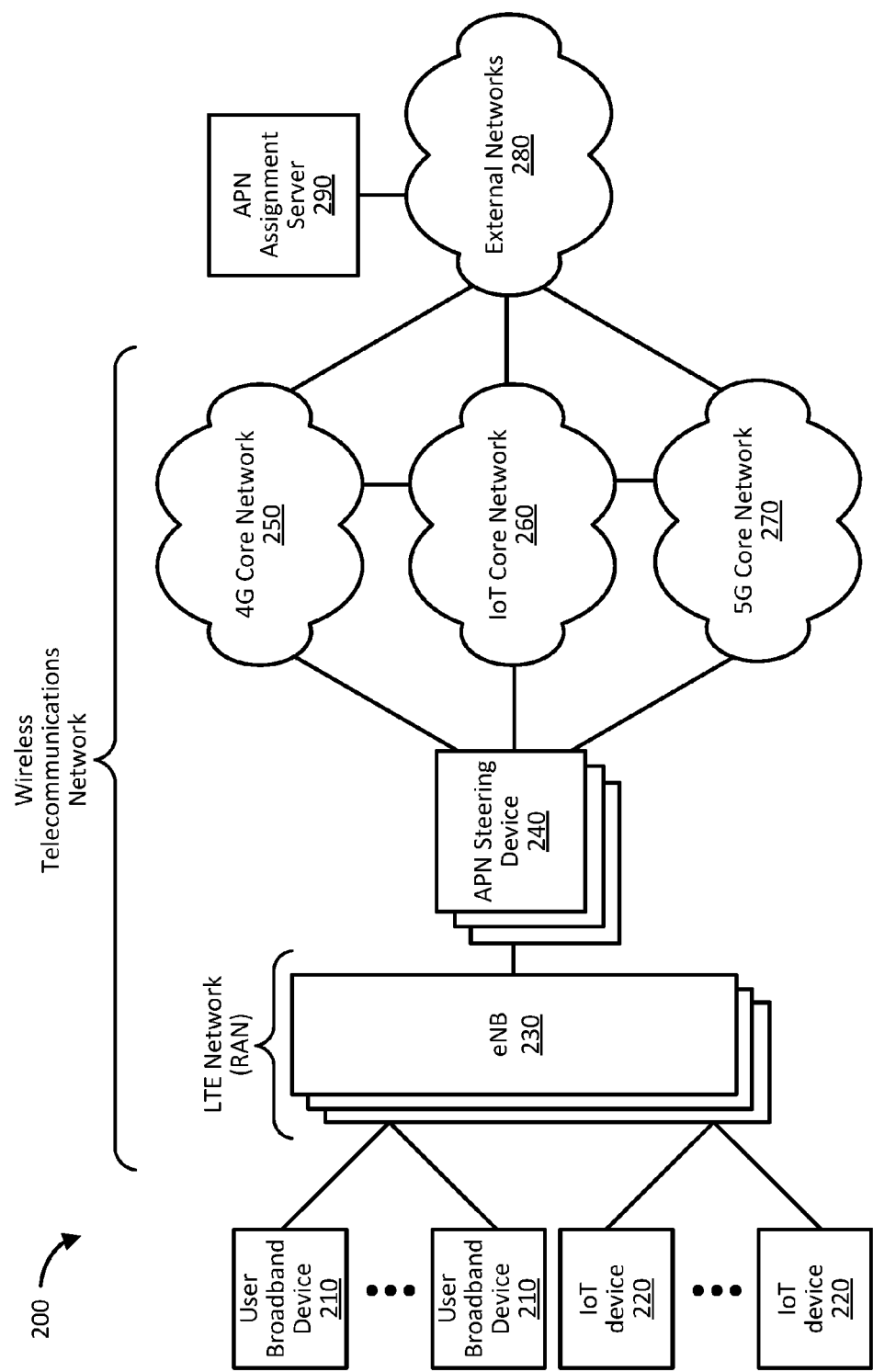
FIG. 2 is a diagram of an example environment in which systems and/or methods described herein may be implemented.

FIG. 2 is a diagram of an example environment 200 in which systems and/or methods described herein may be implemented. Environment 200 may include user broadband devices 210, IoT devices 220, a wireless telecommunication network, external networks 280, and APN assignment server 290. The wireless telecommunication network may include a Radio Access Network (RAN), APN steering devices 240, 4G core network 250, IoT core network 260, and 5G core network 270. The RAN may include one or more air interface technologies such as a 4G Long-Term Evolution (LTE) network and a 5G network consisting of one or more base stations, some or all of which may take the form of eNBs 230, via which broadband devices 210 and IoT devices 220 may communicate with 4G core network 250, IoT core network, and/or 5G core network 270.

User broadband device 210 may include a portable computing and communication device, such as a personal digital assistant (PDA), a smart phone, a cellular phone, a laptop computer with connectivity to the wireless telecommunication network, a tablet computer, etc. User broadband device 210 may also include a non-portable computing device, such as a desktop computer, a consumer or business appliance, or another device that has the ability to connect to a RAN of the wireless telecommunication network. User broadband device 210 may also include a computing and communication device that may be worn by a user (also referred to as wearable devices) such as a watch, a fitness band, a necklace, glasses, an eyeglass, a ring, a belt, a headset, or another type of wearable device.

User broadband device 210 may be capable of communicating a request, to eNB 230, to establish a connection with the wireless telecommunication network. The request may include an APN ID, which may indicate a particular a core network to which the user broadband device 210 is to connect. For instance, in scenarios where the request includes a request to establish a multimedia call session, the APN ID may indicate that the connection should be established with 4G core network 250 (e.g., based on QoS requirements of the multimedia call session and the ability of 4G core network 250 to provide the required QoS).

In another example, in scenarios where the request includes a request to stream video content, the APN ID may indicate that the connection should be established with the 5G core network 570 (e.g., based on the network services for which the UE is connecting to the network). In some implementations, user broadband device 210 may also, or alternatively, be used to register another UE (e.g., another user broadband device 210, IoT device 220, or some other type of device that accesses a core network through a RAN (e.g., through an eNB 230)) with APN assignment server 290. This registration may cause the UE being registered to receive an APN ID, which may be used by the registered UE to connect to the appropriate core network and gain access to the network services for which the UE was registered.

IoT device 220 may include a wireless computing and communication device that may be designed to collect certain types of information and send the information to a destination device (e.g., a server) via the wireless telecommunication network. Examples of IoT device 220 may include a device within an ATM that tracks and reports an amount of cash in the ATM, a device within a vehicle that monitors and reports a velocity, an acceleration, a temperature, or other conditions within the vehicle, and a device connected to a utilities meter for measuring and reporting utility usage information. Relative to user broadband device 210, the amount of information sent by IoT device 220 to the wireless telecommunication network may be small. Additionally, the information may be somewhat narrow in scope (e.g., the temperature readings inside an engine of a vehicle) and/or may not be provided in a complex or cumbersome format (e.g., multimedia information). IoT device 220 may include a machine-to-machine (M2M) services, a machine-type-communication (MTC) device, or another type of device that communicates with a wireless telecommunication network in a similar manner.

IoT device 220 may, however, be similar to user broadband device 210 regarding some of the techniques described herein. For instance, IoT device 220 may be capable of communicating a request, to eNB 230, to establish a connection with the wireless telecommunication network. The request may include an APN ID, which may indicate the core network to which IoT device 220 is to connect. For instance, in scenarios where the request includes a request to establish a connection for telematics services, the APN ID may indicate that the connection should be established with IoT core network 260 (e.g., based on QoS requirements of the requested telematics services and/or based on a device type or device identifier associated with IoT device 220).

eNB 230 may include one or more network devices that receive, process, and/or transmit traffic destined for and/or received from user broadband device 210 and/or IoT device 220 via an air interface. eNB 230 may be connected to a network device (in addition to APN steering device 240), such as a site router, that functions as an intermediary for information communicated between eNB 230 and 4G core network 250, IoT core network 260, and/or 5G core network 270.

APN steering device 240 may include a computing and communication device that receives connection requests originating from a UE, determines an APN ID included in the connection request (e.g., Initial Attach or PDN Connectivity Request message), identifies an appropriate core network for the UE based on an APN ID, and the connection request between the UE and the appropriate core network. In some implementations, APN steering device 240 may be implemented by one or more server devices and/or network devices (e.g., switches, routers, gateways, etc.). In some implementations, APN steering device 240 may be implemented by another device of FIG. 2, such as eNB 230. APN steering device 240 may include an APN routing policy that associates APN IDs with network services and/or particular core networks. APN steering device 240 may use the APN routing policy to determine which core network is appropriate for each connection request from a UE.

4G core network 250 may include one or more network devices, some or all of which may be similar to network devices provided in a traditional enhanced packet core (EPC) network of the 3rd Generation Partnership Project (3GPP) communications standard. Specific examples of such devices are discussed below with reference to FIG. 3. 4G core network 250 may operate as a core network for certain UEs, such as user broadband devices, communication terminals, or other types of UEs that would benefit from broadband network services. For instance, 4G core network 250 may be capable of providing Internet access, media sessions for voice and/or video calling services, support for mobile applications, etc.

IoT core network 260 may include one or more network devices, some or all of which may be similar to network devices provided in a traditional EPC network. Examples of such devices are discussed below with reference to FIG. 3. IoT core network 260 may primarily be for usage by IoT devices 220. As such, IoT core network 260 may be implemented using fewer/different resource allocations, with network elements and policies commensurate to supporting the lower resource usage patterns of IoT devices (e.g., lower data exchange rates (and lower overall data quantities), no audio/video capabilities, limited mobility, limited external network access, higher periods of inactivity, higher volumes of served devices, etc.). For instance, IoT core network 260 may be capable of providing IoT devices with connectivity to servers and/or data repositories to which IoT devices 220 may send information. In some implementations, the servers and/or data repositories to which IoT devices 220 may send information may be connected to, and/or part of, external networks 280.

5G core network 270 may include one or more network devices, some or all of which may be similar to network devices provided in a traditional enhanced packet core (EPC). Specific examples of such devices are discussed below with reference to FIG. 3. 5G core network 270 may operate as a core network for certain UEs, such as user broadband devices, set-top boxes (STB), smart televisions, and/or other types of UEs that may benefit from advanced network services (increased bandwidth, higher QoS, etc.). For instance, 5G core network 270 may be suited for providing broadband television services, on-demand video, other types of streaming video, etc.

External networks 280 may include one or more additional networks, such as a Public Land Mobile Network (PLMN), a Public Switched Telephone Network (PSTN), and/or an Internet Protocol (IP) network (e.g., the Internet, private IP networks). As shown, 4G core network 250, IoT core network 260, and/or 5G core network 270 may enable a UE to connect to external networks 280. For example, user broadband device 210 may access a webpage hosted by an application server, of external networks 280, via 4G core network 250; IoT device 220 may provide information, collected by IoT device 220, to an application server via IoT core network 260; and another type of user broadband device 210 may access streaming video content, via 5G core network 270, which may be hosted by a content server of external networks 280.

APN assignment server 290 may include one or more computing devices, such as a server device or a collection of server devices, capable of creating an APN routing policy by associating APN IDs with core networks and providing the APN routing policy to APN steering device 240. APN assignment server 290 may also be capable of providing an interface (e.g., a web interface) through which a user may associate a particular UE with one or more network services. Based on the network services associated with a particular UE, APN assignment server 290 may provide the APN IDs, corresponding to those network services, to the particular UE. APN assignment server 290 may also support functions and protocols defined by OMA (Open Mobile Alliances) for device managements.

Figure 3:
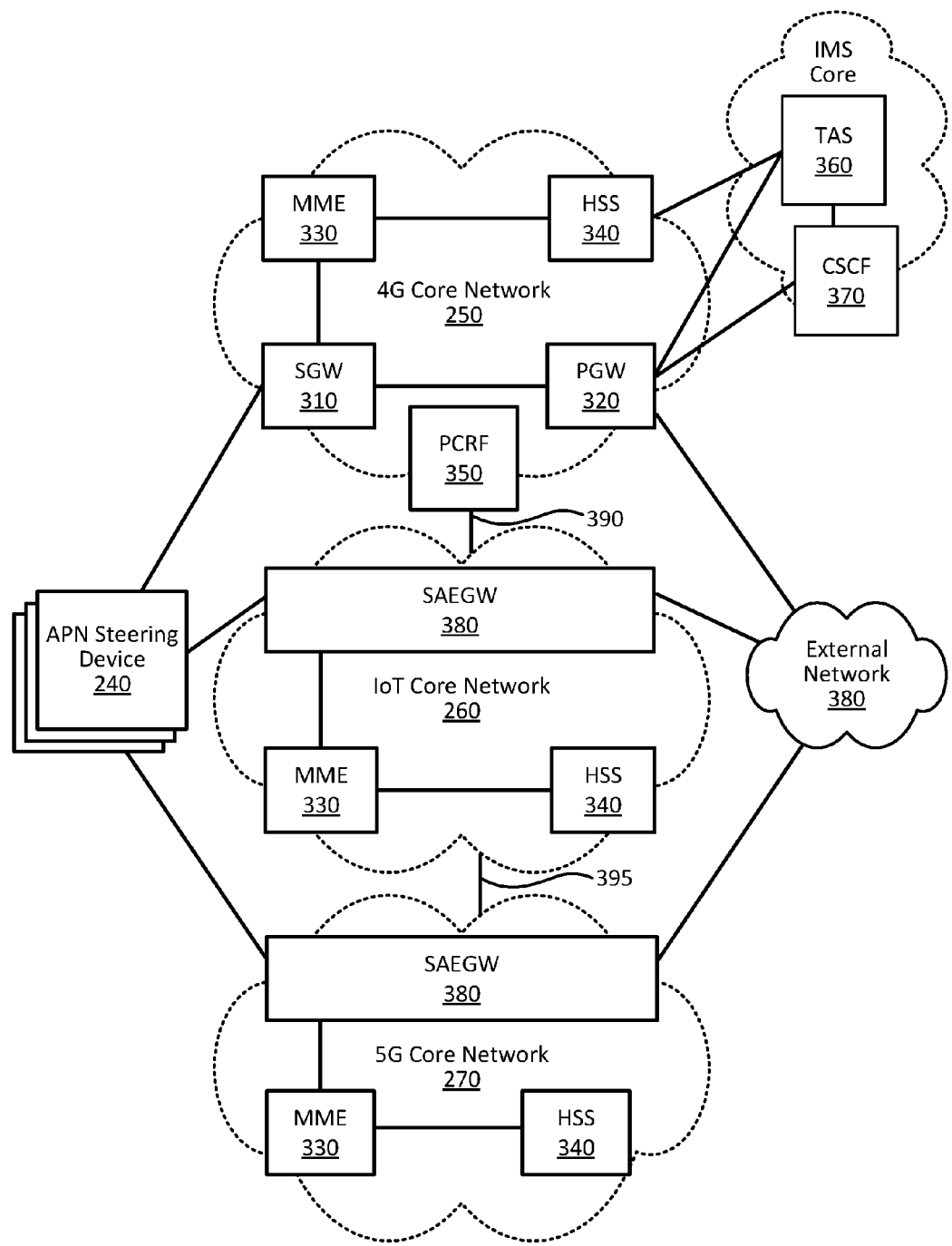
FIG. 3 is a diagram of an example network in which systems and/or methods described herein may be implemented.

FIG. 3 is a diagram of an example network 300 in which systems and/or methods described herein may be implemented. As shown, network 300 may include APN steering devices 240, 4G core network 250, IoT core network 260, 5G core network 270, and external networks 280, which are descried above with reference to FIG. 2.

FIG. 3 provides examples of systems and devices that may be used to implement 4G core network 250, IoT core network 260, and 5G core network 270. As shown, 4G core network 250 may include one or more Serving Gateways (SGW) 310, one or more PDN Gateways (PGW) 320, one or more Mobility Management Entities (MME) 330, and/or one or more Home Subscriber Servers (HSS) 340. Additionally, 4G core network 250 may include an Internet Protocol (IP) Multimedia Subsystem (IMS) core, which may include a telephony application server (TAS) 360 and a Call Session Control Function (CACF) 370. In some implementations, the IMS core may include additional devices, such as an HSS server, media servers, additional application servers, etc. The IMS core may help deliver IP multimedia services, such as Voice over IP (VoIP) services, video calling services, etc., to UEs. Additionally, the IMS core may operate based on the 3GPP wireless communication standard. Similar to 4G core network 250, IoT core network 260 and 5G core network 270 may each include one or more SGWs 310, PGWs 320, MMEs 330 and/or HSSes 240; however, in some implementations, instead of SGWs 310 and/or PGWs 320, IoT core network 260 and 5G core network 270 may include a system architecture evolution gateway (SAEGW) 380 that condenses/eliminates certain capabilities of SGWs 310 and/or PGWs 320. IoT core network 270 may support less-demanding network availability and reliability standards than normally required in a 4G core network 250 for some delay-tolerant IoT services.

An SGW 310 may aggregate traffic received from one or more RANs and may send the aggregated traffic to an external network or device via a PGW 320. Additionally, an SGW 310 may aggregate traffic received from one or more PGWs 320 and may send the aggregated traffic to one or more RANs. SGWs 310 may operate as an anchor for the user plane (e.g., user data or bearer traffic) during inter-eNB handovers and as an anchor for mobility between different telecommunication networks. PGWs 320 may include one or more network devices that may aggregate traffic received from one or more SGWs 310, and may send the aggregated traffic to an external network. A PGW 320 may also, or alternatively, receive traffic from the external network and may send the traffic toward a UE (e.g., via SGW 310).

MME 330 may include one or more computation and communication devices that act as a control node for RANs and/or other devices that provide the air interface for the wireless telecommunication network. For example, MME 330 may perform operations to register UE with the wireless telecommunication network, to establish bearer channels (e.g., traffic flows) associated with a session with user broadband device 210 and/or IoT device 220, to hand off user broadband device 210 to a different eNB, MME, or another network due to movement, and/or to perform other operations. MME 330 may perform policing operations on traffic destined for and/or received from a UE.

HSSes 340 may include one or more devices that may manage, update, and/or store, in a memory associated with HSS 340, profile information associated with a subscriber (e.g., a subscriber associated with a UE). The profile information may identify applications and/or services that are permitted for and/or accessible by the subscriber; a Mobile Directory Number (MDN) associated with the subscriber; bandwidth or data rate thresholds associated with the applications and/or services; and/or other information. Additionally, or alternatively, HSS 340 may perform authentication, authorization, and/or accounting operations associated with the subscriber and/or a communication session with a UE. HSSes 340 may also store APN IDs to which a UE has been assigned, as well as other parameters associated with establishing bearers through the core network (e.g., quality of service parameters, etc.)

HSSes 340 are depicted in FIG. 3 as multiple entities serving particular core networks (i.e., 4G core network 250, IoT core network 260, and 5G core network 270). However, in other implementations, a single HSS 340 may serve multiple core networks (e.g. each MMS 330 may connect to the HSS 340 to obtain UE profile information, etc.) Accordingly, the arrangement and configuration of HSS 340 and the core networks may be implemented in a wide variety of ways.

PCRF 350 may receive information regarding policies and/or subscriptions from one or more sources, such as subscriber databases and/or from one or more users. PCRF 350 may provide these policies to PGW 320 or another device (e.g., SAEGW 380) so that the policies can be enforced. As depicted, in some implementations, PCRF 350 may communicate with PGW 320 or another device (e.g., SAEGW 380) to ensure that charging policies are properly applied to locally routed sessions within the wireless telecommunication network. For instance, after a locally routed session is terminated, PGW 320 (and/or SAEGW 380) may collect charging information regarding the session and provide the charging information to PCRF 350 for enforcement.

PCRF 350 is depicted in FIG. 3 as a single entity serving multiple core networks (i.e., 4G core network 250, IoT core network 260, and 5G core network 270) via connections 390 and 395. However, in other implementations, a wireless telecommunication network may include a different arrangement/configuration between core networks 250, 260, and 270 and PCRF 350. For instance, some implementations may include a different PCRF 350 for each core network within the wireless telecommunication network. In other example, a wireless telecommunication network may include some core networks that share a single PCRF 350 while other core networks each have their own PCRF 350. Accordingly, the arrangement and configuration of PCRF 350 and the core networks may be implemented in a wide variety of ways.

TAS 360 may include one or more computation and communication devices that may provide IP call (e.g., VoIP) services. TAS 360 may translate a telephone number into an IP address and/or an IP address into a telephone number in order to establish a call. TAS 360 may also provide call routing and/or call bridge services. TAS 360 may also provide answering services, call forwarding services, and free-call routing services (e.g., for so-called "1-800" numbers). TAS 360 may operate based on a particular communication protocol, such as Session Initiation Protocol (SIP). In some implementations, TAS 360 may include software, such as a call management application, that enables TAS 360 to perform one or more of the operations described herein, such as determining the connection status of a UE, determining how to notify the UE of an ongoing call based on the connection status of the UE (e.g., by using Session Initiation Protocol (SIP) messaging, Simple Messaging Service (SMS) messaging, etc.), and/or causing calls to be transferred from one UE to another UE.

CSCF 370 may include one or more computation and communication devices that may gather, process, search, store, and/or provide information in a manner described herein. CSCF 370 may process and/or route calls to and from UEs via 4G core network 250. For example, CSCF 370 may process calls, received from an external network, that are destined for user broadband device 210. In another example, CSCF 370 may process calls, received from user broadband device 210, that are destined for the external network.

SAEGW 380 may include a computing and communication device that combines some or all of the functionality of SGW 310 and PGW 320 into a single device. For example, SAEGW 380 may aggregate traffic received from RANs (e.g., via APN steering device 240) and may send the aggregated traffic to an external network or device. Additionally, SAEGW 380 may operate as an anchor for the user plane during inter-eNB handovers and as an anchor for mobility between different telecommunication networks. SAEGW 380 may also, or alternatively, receive traffic from the external network and may send the traffic toward a particular UE (e.g., user broadband device 210, IoT device 220, etc.).

The quantity and arrangement of devices and/or networks, illustrated in FIGS. 2 and 3 are provided for explanatory purposes only. In practice, there may be additional devices and/or networks; fewer devices and/or networks; different devices and/or networks; or differently arranged devices and/or networks than illustrated in FIGS. 2 and 3. For example, 4G core network 250, IoT core network, and/or 5G core network 270 may include some or all of a Public Land Mobile Network (PLMN). Alternatively, or additionally, one or more of the devices illustrated in FIGS. 2 and 3 may perform one or more functions described as being performed by another one or more of the devices illustrated in FIGS. 2 and 3. The illustrated devices may interconnect via wired connections, wireless connections, or a combination of wired and wireless connections.

Figure 4:
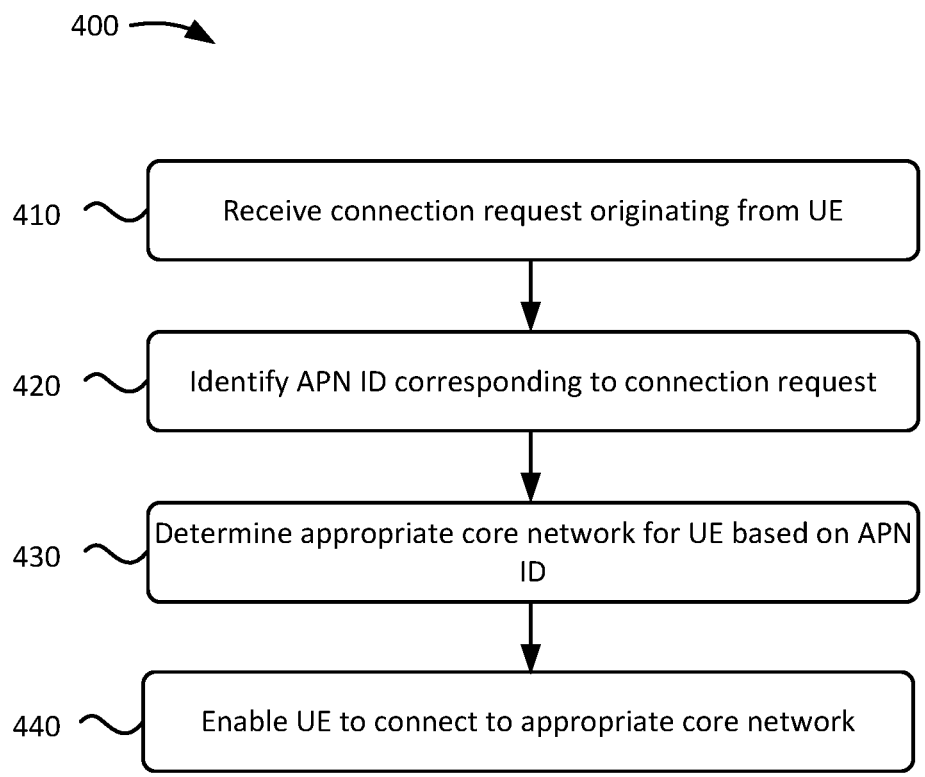
FIG. 4 is a flowchart diagram of an example process for connecting user equipment (UE) with a particular core network.

FIG. 4 is a flowchart diagram of an example process 400 for connecting a UE with a particular core network. In some implementations, process 400 may be implemented by APN steering device 240. In some implementations, process 700 may be implemented by eNB 230.

As shown, process 400 may include receiving a connection request originating from a UE (block 410). For example, APN steering device 240 may receive a request, originating from a UE (e.g., user broadband device 210, IoT device 220, etc.), to connect with a core network of a wireless telecommunication network. The UE may have sent the connection request to eNB 230, and eNB 230 may have forwarded the request to APN steering device 240.

Process 400 may include identifying an APN ID corresponding to the connection request (block 420). For instance, the connection request received by APN steering device 240 may include an APN ID, either in the information element called Request Type, the information element called APN, or another location in the PDN Connectivity Request message, that corresponds to a particular service that is supported by one of the core networks of the wireless telecommunication network. The APN ID may include a unique series of numbers, letters, symbols, or a combination thereof (e.g., a fully qualified domain name).

Process 400 may include determining an appropriate core network for the UE based on the APN ID (block 430). For example, APN steering device 240 may compare the APN ID in the connection request to an APN routing policy stored by APN steering device 240. The APN routing policy may include a table (or another type of data structure) that associates APN IDs with respective core networks of the wireless telecommunication network. An example of an APN routing policy is discussed below with reference to FIG. 6.

If APN steering device 240 selects the wrong core network by itself (due to some internal error) or because of wrong APN ID being sent by the UE, MME 330 in the selected core network may reject the request when the corresponding core network does not support the service or when the UE is not authorized to request service from that core network. As a result, the user at the UE may contact the home operator of the wireless telecommunications network and the issue can then be resolved. Alternatively, or additionally, MME 330 can log an error so that an operation team of the selected core network can trouble-shoot the issue and take corrective action. However, if APN steering device 240 selects the wrong core network by itself (due to some internal error) or because of wrong APN ID being sent by the UE, the core network may honor the request when the UE is authorized to receive services from the selected core network and the selected core network can support the request. The selected network may not be optimal to provide the service but this is still acceptable because this situation should happen only in rare occasions.

Process 400 may include enabling a UE to connect to the appropriate core network (block 440). For instance, APN steering device 240 may route the connection request to the MME in the appropriate core network so that UE may establish a connection with the appropriate core network. In some implementations, APN steering device 240 may route the connection request based on IP addresses included in the APN routing policy. The established connection between the UE and the appropriate core network may enable the UE to access the network services for which the connection request was initially sent using the facilities of the core network.

Figure 5:
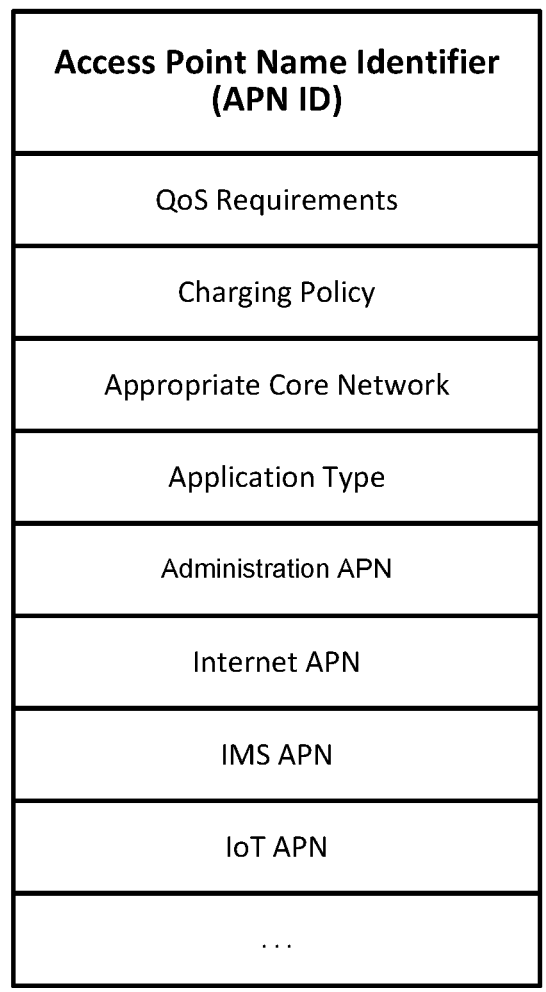
FIG. 5 illustrates examples of how a wireless telecommunication network may use an Access Point Name Identifier (APN ID)

FIG. 5 illustrates examples of how a wireless telecommunication network may use an APN ID. As shown, an APN ID may be associated with QoS requirements, charging policies, an appropriate core network, services and more. For instance, when a UE sends a request to connect to a wireless telecommunication network, the request may include an APN ID. The APN ID may correspond to a network service for which the UE as requested the connection. For example, the APN ID may indicate that the connection is intended for Internet access services, telematics services, video streaming services, or another type of network service. The wireless telecommunication network may use the APN ID to determine the level of service (e.g., the QoS) required by the connection, the charging policy for the service (e.g., the manner in which the user of the UE will be charged for the service), and other information associated with establishing the connection. As shown, the APN ID may correspond to an Administrative APN, an Internet APN, an IMS APN, and/or an IoT APN. This information may be stored in the HSS 340 records associated with the UE.

FIG. 6 illustrates an example APN routing policy that may be implemented by APN assignment server 240. As shown, an example APN routing policy may include APN IDs, service descriptions, MME IP addresses, and routing descriptions. The example APN routing policy of FIG. 6 represents only one of many possible implementations of an APN routing policy. In practice, an APN routing policy may include additional information, less information, different information, and/or differently arranged information than the example depicted in FIG. 6.

An APN ID may include a unique identifier that represents a type of service supported by at least one of the core networks of a wireless telecommunication network. For example, Internet_APN may correspond to an Internet access service, Apps_APN may correspond to a mobile application support service, Enterprise_APN may correspond to a private network service available to a particular company or organization, Telematics_APN may correspond to telematics services, and so forth. As shown, each APN ID may be associated with a service description. For instance, Internet_APN and Apps_APN are each associated with 4G/VoLTE (Voice over LTE); Enterprise_APN, Telematics_APN, and PrivateNetwork_APN are each associated with IoT/M2M; and BroadbandTV_APN and OnDemmand_APN are each associated with 5G. Each service description may indicate the type of core network that corresponds to each APN ID. For instance, Internet_APN may correspond to 4G core network 250, Telematics_APN may correspond to IoT core network 260, and BroadbandTV_APN may correspond to 5G core network 270.

Each APN ID may also be associated with an MME IP address, which may be associated with an MME of a particular core network. For example, the APN IDs that correspond to 4G core network 250 may be directed to MMEs 330 of 4G core network 250, the APN IDs that correspond to IoT core network 260 may be directed to MMEs 330 of IoT core network 260, etc. Additionally, as indicated by the routing description associated with each APN ID, APN steering device 240 may use the MME IP address to route the connection request from a UE to the appropriate core network. Routing the connection request to an MME of the appropriate core network may enable the UE to connect to the appropriate core network.

Figure 7:
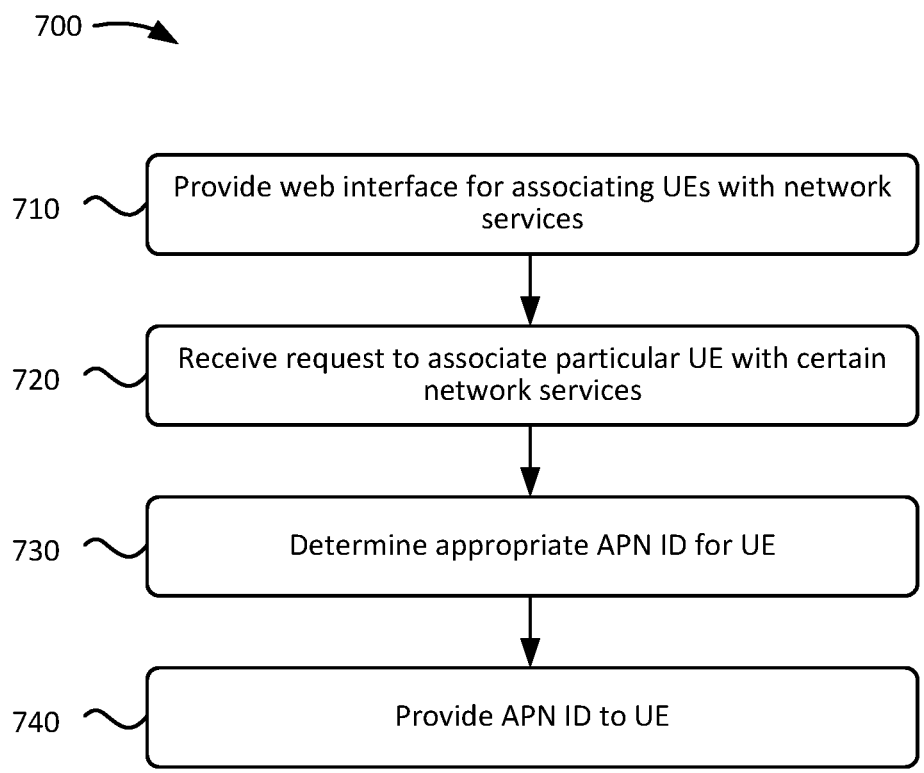
FIG. 7 illustrates an example process for providing a UE with APN IDs for accessing network services associated with one or more core networks.

FIG. 7 illustrates an example process 700 for providing a UE with APN IDs for accessing network services associated with one or more core networks. In some implementations, process 700 may be implemented by APN assignment server 290.

As shown, process 700 may include providing a web interface for associating UEs with network services (block 710). For example, a user (via user broadband device 210) may access a web interface that is hosted by APN assignment server 290 (or by a device that is communicatively coupled with APN assignment server 290). The web interface may include options to select one or more network services that a wireless telecommunication network is able to provide to UEs (e.g., other user broadband devices 210, IoT devices 220, etc.). Examples of such services may include providing UEs with Internet access, mobile application services, VPN services, telematics services, VoD services, etc. The user may use the web interface to register a particular UE for one or more of the network services being provided (e.g., by entering an identifier of the UE, such as a mobile device number (MDN), an International Mobile Station Equipment Identity (IMEI), etc.).

Process 700 may also include receiving a request to associate a particular UE with certain network services (block 720). For instance, after identifying the UE to be registered and the network services for which the UE is being registered, the user may input a command that causes APN assignment server 290 to create an association between the UE and the selected network services. APN assignment server 290 may store the logical association (e.g., as part of a user account) so that the user may, for example, later review and/or change the network services for which the UE is registered. In some implementations, the user may be charged for the networks services that he or she has selected for a particular UE.

In some implementations, the techniques described herein may be implemented without the user registering the UE for one or more network services. For example, in some implementations, the UE may receive a mapping (or another type of information) between applications/application types and APN IDs. In such an implementation, the UE may determine the appropriate APN ID when connecting to the network based on the application/application type being used by the UE. In some implementations, the mapping may be received when the UE initially registers with the network. Additionally, or alternatively, the UE may use a default APN ID in scenarios involving an undefined application or network services (i.e., an application or network service for which an APN ID is not specified).

Process 700 may also include determining appropriate APN IDs for the particular UE (block 730). For example, APN assignment server 290 may identify APN IDs that correspond to the network services for which the UE has been registered. For instance, (referring to the APN IDs of FIG. 6), if the UE was registered for Internet access services, mobile application services, and VoD services, APN assignment server 290 may determine that Internet_APN, Apps_APN, and OnDemandVideo_APN are appropriate for the UE. In some implementations, APN assignment server 290 may include a copy of the APN routing policy stored by APN steering devices 240, and may use the APN routing policy to identify the APN IDs that appropriate for a UE give the network services for which the UE has been registered.

Process 700 may also include providing the APN IDs to the UE (block 740). For instance, APN assignment server 290 may communicate, to the UE, the APN IDs that correspond to the network services for which the UE was registered (e.g., a mapping between particular services and particular APN IDs). In some implementations, the APN IDs may be communicated to the UE in response to the UE connecting to the wireless telecommunication network. In some scenarios, when the UE first connects to the wireless telecommunication network, the UE may use a default APN ID to connect to the network (e.g., to connect to a default core network, such as 4G core network 250). After connecting to the network via the default APN ID, the UE may receive the APN IDs identified by APN assignment server 290. Thereafter, the UE may use the APN IDs identified by APN assignment server 290 to connect to particular core networks (e.g., 4G core network 250, IoT core network 260, and 5G core network 270).

Figure 8:
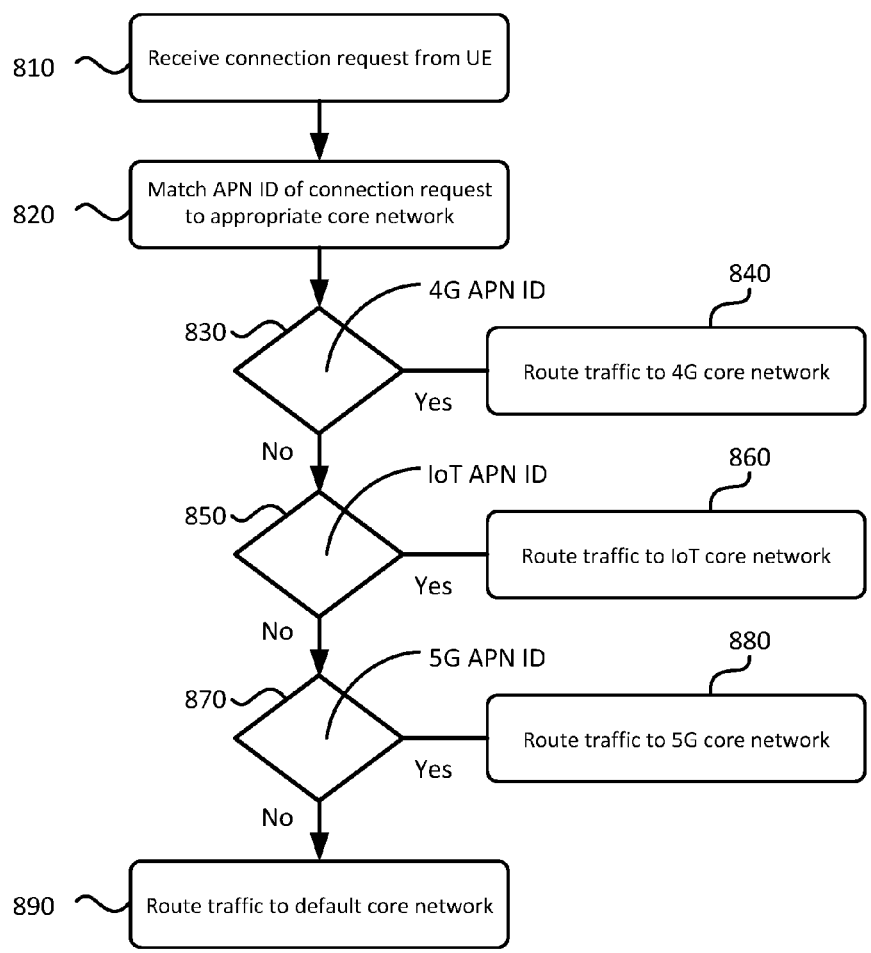
FIG. 8 illustrates an example process for routing traffic from a UE to a core network based on an APN ID provided by the UE.

FIG. 8 illustrates an example process 800 for routing connection request from a UE to a core network based on an APN ID provided by the UE. In some implementations, process 700 may be implemented by APN steering device 240. In some implementations, process 700 may be implemented by eNB 230.

As shown, process 800 may include receiving a connection request from a UE (block 810). For example, a UE may send a request to eNB 230 to connect to a wireless telecommunication network, and eNB 230 may forward the request to APN steering device 240. In some implementations, APN steering device 240 may be incorporated into eNB 230, and in such implementations, eNB 230 may determine an appropriate core network for the request).

Process 800 may also include matching an APN ID of the connection request with an appropriate core network (block 820). For instance, APN steering device 240 may extract an APN ID from the request and compare the APN ID to APN IDs that are part of an APN routing policy being implemented by the network. An example of an APN routing policy, which includes examples of APN IDs, in discussed above with reference to FIG. 6. In response to comparing the APN ID of the request to the APN IDs of the APN routing policy, APN steering device 240 may determine whether the APN ID corresponds to a 4G APN ID (i.e., an APN ID corresponding to 4G core network 250) (block 830).

When the APN ID of the connection request corresponds to a 4G APN ID (block 830—Yes), process 800 may include routing traffic from the UE to 4G core network 250 (block 840). APN steering device 240 may route the traffic in accordance with the APN routing policy. For example, as described above with reference to FIG. 6, the APN routing policy may include an IP address of an MME, of 4G core network 250, that should receive the traffic from the UE.

However, when the APN ID of the connection request does not correspond to a 4G APN ID (block 830—No), process 800 may include determining whether the APN ID corresponds to an IoT APN ID (block 850). This determination may be performed in the same manner as the determination of whether the APN ID of the request corresponds to a 4G APN ID. That is, APN steering device 240 may compare the APN ID from the request with the APN IDs, in the APN router policy, that correspond to IoT core network 260.

When the APN ID of the connection request corresponds to an IoT APN ID (block 850—Yes), process 800 may include routing traffic from the UE to IoT core network 260 (block 860). APN steering device 240 may route the traffic in accordance with the APN routing policy. For example, as described above with reference to FIG. 6, the APN routing policy may include an IP address of an MME, of IoT core network 260, that should receive the traffic from the UE.

When the APN ID of the connection request does not correspond to an IoT APN ID (block 850—No), process 800 may include determining whether the APN ID corresponds to a 5G APN ID (block 870). This determination may also be performed in the same manner as the determination of whether the APN ID of the request corresponds to a 4G APN ID. That is, APN steering device 240 may compare the APN ID from the request with the APN IDs, in the APN router policy, that correspond to 5G core network 270.

When the APN ID of the connection request corresponds to a 5G APN ID (block 870—Yes), process 800 may include routing traffic from the UE to 5G core network 270 (block 880). APN steering device 240 may route the traffic in accordance with the APN routing policy. For example, as described above with reference to FIG. 6, the APN routing policy may include an IP address of an MME, of 5G core network 270, that should receive the traffic from the UE.

When the APN ID of the connection request does not correspond to a 5G APN ID (block 870—No), process 800 may include routing connection request from the UE to a default core network (block 890). The APN routing policy may include instructions for routing traffic that does not include an APN ID that is specifically included in the APN routing policy. For example, when a connection request includes an APN ID that is not included in the APN routing policy (and/or when the request does not include an APN ID) APN steering device 240 may route the traffic to a core network (e.g., 4G core network 250) that has been designated as a default core network for such communications.

Figure 9:
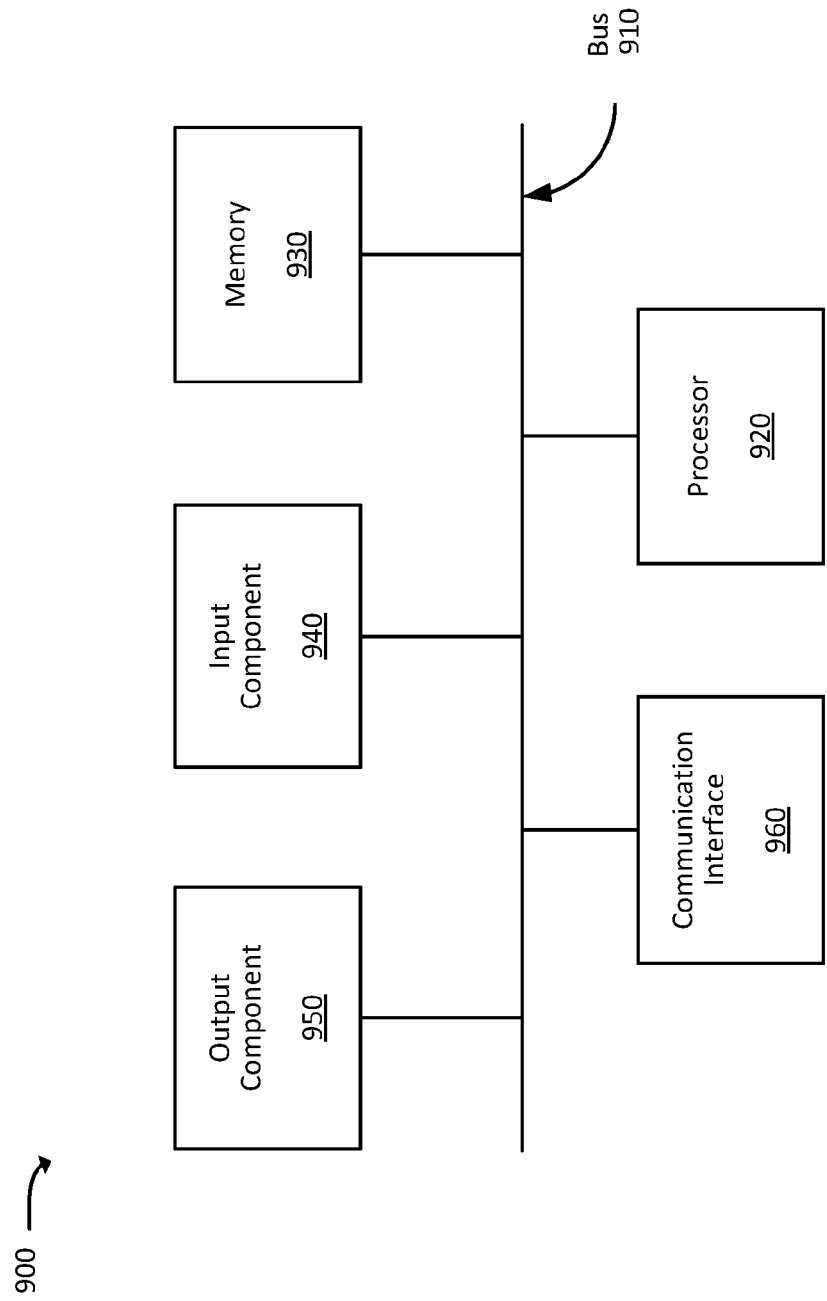
FIG. 9 is a block diagram of example components of a device.

FIG. 9 is a diagram of example components of a device 900. Each of the devices illustrated in FIGS. 1-3 may include one or more devices 900. Device 900 may include bus 910, processor 920, memory 930, input component 940, output component 950, and communication interface 960. In another implementation, device 900 may include additional, fewer, different, or differently arranged components. As described herein, a component may be implemented by hardware circuitry, software logic, and/or some combination thereof.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1, 4, 7, and 8 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A network device, comprising circuitry to:
communicate with a plurality of Mobility Management Entities (MMEs) operating in a plurality of core networks of a wireless telecommunication network, the plurality of core networks associated with a single Public Land Mobile Network Identifier (PLMNID);
receive a request, originating from a user equipment (UE), to connect to the wireless telecommunication network;
determine a network service identifier included in the request to connect, wherein the network service identifier is different than the PLMNID and corresponds to a network service accessible via a gateway device of a particular core network of the plurality of core networks;
compare the network service identifier included in the request to connect to a routing policy that identifies a plurality of network services, corresponding to a plurality of network service identifiers, provided by different core networks of the plurality of core networks;
select, based on comparing the network service identifier to the routing policy, a particular core network, out of the plurality of core networks, for connecting the UE to the wireless telecommunication network, the selecting including determining that the particular core network is associated with the network service identifier included in the request originating from the UE; and
route, based on the routing policy, the request, originating from the UE, via the network device to a particular MME, of the plurality of MMEs operating in the plurality of core networks, the particular MME operating in the selected particular core network.

2. The network device of claim 1, wherein the request is received from an enhanced Node B (eNB) of a Long-Term Evolution (LTE) network.

3. The network device of claim 1, wherein:
the network device includes an enhanced Node B (eNB) of a Long-Term Evolution (LTE) network, and
the gateway device includes a Packet Data Network Gateway (PGW).

4. The network device of claim 1, wherein the plurality of core networks include:
a first core network that provides Internet access services, media session call services, and mobile application services,
a second core network that provides telematics services to IoT devices, and
a third core network that provides video streaming services.

5. The network device of claim 1, wherein the routing policy
associates each network service, of the plurality of network services, with an MME of a core network corresponding to the each network service.

6. The network device of claim 1, wherein the network service identifier also indicates:
a Quality of Service (QoS) requirement for the request, the network device including information to determine that the particular core network supports the QoS requirement of the request, and
a charging policy corresponding to the UE and the network service provided by the particular core network.

7. The network device of claim 1, where the UE includes a roaming UE and the network service identifier is a default network service identifier corresponding to the network service provided by the particular core network.

8. The network device of claim 1, wherein the circuitry is to:
while the UE is connected to the particular core network, receive an additional request, from the UE, to connect to the wireless telecommunication network, the additional request including an additional network service identifier corresponding to an additional network service provided by another core network, of the plurality of core networks, that is different from the particular core network,
select, based on the additional network service identifier and the routing policy, the other core network, of the plurality core networks, to provide the additional network service to the UE; and
enable the UE to connect to the other core network by routing traffic, corresponding to the additional request, between the UE and the other core network.

9. A non-transitory computer-readable medium to cause one or more processors to execute processor-executable instructions, wherein the processor-executable instructions cause the one or more processors to:
communicate with a plurality of Mobility Management Entities (MMEs) operating in a plurality of core networks of a wireless telecommunication network, the plurality of core networks associated with a single Public Land Mobile Network Identifier (PLMNID
receive a request, originating from a user equipment (UE), to connect to the wireless telecommunication network;
determine a network service identifier included in the request to connect, wherein the network service identifier is different than the PLMNID and corresponds to a network service accessible via a gateway device of a particular core network of the plurality of core networks;
compare the network service identifier included in the request to connect to a routing policy that identifies a plurality of network services, corresponding to a plurality of network service identifiers, provided by different core networks of the plurality of core networks;
select, based on comparing the network service identifier to the routing policy, a particular core network, out of the plurality of core networks, for connecting the UE to the wireless telecommunication network, the selecting including determining that the particular core network is associated with the network service identifier included in the request originating from the UE; and
route, based on the routing policy, the request, originating from the UE, via the network device to a particular MME, of the plurality of MMEs operating in the plurality of core networks, the particular MME operating in the selected particular core network.

10. The non-transitory computer-readable medium of claim 9, wherein the request is received from an enhanced Node B (eNB) of a Long-Term Evolution (LTE) network.

11. The non-transitory computer-readable medium of claim 9, wherein:
the network device includes an enhanced Node B (eNB) of a Long-Term Evolution (LTE) network, and
the gateway device includes a Packet Data Network Gateway (PGW).

12. The non-transitory computer-readable medium of claim 9, wherein the plurality of core networks include:
a first core network that provides Internet access services, media session call services, and mobile application services,
a second core network that provides telematics services to IoT devices, and
a third core network that provides video streaming services.

13. The non-transitory computer-readable medium of claim 9, wherein the routing policy:
associates each network service, of the plurality of network services, with an MME of a core network corresponding to the each network service.

14. The non-transitory computer-readable medium of claim 9, wherein the network service identifier includes:
a Quality of Service (QoS) requirement for the request, the network device including information to determine that the particular core network supports the QoS requirement of the request, and
a charging policy corresponding to the UE and the network service provided by the particular core network.

15. The non-transitory computer-readable medium of claim 9, wherein the processor-executable instructions cause the one or more processors to:
while the UE is connected to the particular core network, receive an additional request, from the UE, to connect to the wireless telecommunication network, the additional request including an additional network service identifier corresponding to an additional network service provided by another core network, of the plurality of core networks, that is different from the particular core network,
select, based on the additional network service identifier and the routing policy, the other core network, of the plurality core networks, to provide the additional network service to the UE; and
enable the UE to connect to the other core network by routing traffic, corresponding to the additional request, between the UE and the other core network.

16. A method, implemented by a network device, comprising:
communicating with a plurality of Mobility Management Entities (MMES) operating in a plurality of core networks of a wireless telecommunication network, the plurality of core networks associated with a single Public Land Mobile Network Identifier (PLMNID);
receiving, by the network device, a request, originating from a user equipment (UE), to connect to the wireless telecommunication network;
determining, by the network device, a network service identifier included in the request to connect, wherein the network service identifier is different than the PLMNID and corresponds to a network service accessible via a gateway device of a particular core network of the plurality of core networks;
comparing, by the network device, the network service identifier included in the request to connect to a routing policy that identifies a plurality of network services, corresponding to a plurality of network service identifiers, provided by different core networks of the plurality of core networks;
selecting, by the network device and based on comparing the network service identifier to the routing policy, a particular core network, out of the plurality of core networks, for connecting the UE to the wireless telecommunication network, the selecting including determining that the particular core network is associated with the network service identifier included in the request originating from the UE; and
routing, based on the routing policy, the request, originating from the UE, via the network device to a particular MME, of the plurality of MMEs operating in the plurality of core networks, the particular MME operating in the selected particular core network.

17. The method of claim 16, wherein the routing policy associates each network service, of the plurality of network services, with an MME of a core network corresponding to the each network service.

18. The method of claim 16, wherein the network service identifier also indicates:
 a Quality of Service (QoS) requirement for the request, the network device including information to determine that the particular core network supports the QoS requirement of the request, and
 a charging policy corresponding to the UE and the network service provided by the particular core network.

19. The method of claim 16 further comprising:
 registering the UE with the wireless telecommunication network; and
 providing, based on the registering, a subset of the plurality of network service identifiers to the UE, wherein the subset of network service identifiers comprises one or more network service identifiers that correspond to one or more of the plurality of network services that the UE is authorized to access from the wireless telecommunication network.

20. The method of claim 16 wherein the routing comprises:
 establishing, by the network device, a connection between the UE and the particular core network.

* * * * *